(12) United States Patent
Hudson et al.

(10) Patent No.: US 7,165,272 B2
(45) Date of Patent: Jan. 23, 2007

(54) NOVELTY HEAD GEAR AND METHOD OF MAKING SAME

(76) Inventors: William Hudson, 30809 Middlebury, Westland, MI (US) 48186; Mark J Maness, 3810 Cornell St., Dearborn, MI (US) 48124

(*) Notice: Subject to any disclaimer, the term of this patent is extended or adjusted under 35 U.S.C. 154(b) by 0 days.

(21) Appl. No.: 10/968,768

(22) Filed: Oct. 19, 2004

(65) Prior Publication Data

US 2006/0080759 A1     Apr. 20, 2006

(51) Int. Cl.
    *A42B 1/00*  (2006.01)
(52) U.S. Cl. .................... 2/209.13; 2/10; 2/13
(58) Field of Classification Search ............. 2/209.13, 2/171, DIG. 11, 10, 448, 425, 13; 351/111, 351/51, 52; 446/27; D2/500, 501, 503, D2/866, 894, 895, 868, 869; D11/165, 166; 40/329, 586
    See application file for complete search history.

(56) References Cited

U.S. PATENT DOCUMENTS

| | | | | |
|---|---|---|---|---|
| 3,031,681 | A | * | 5/1962 | Hoeflich .................. 2/200.3 |
| D204,023 | S | * | 3/1966 | Potts ..................... D29/109 |
| 4,909,620 | A | * | 3/1990 | Saccone .................... 351/51 |
| 5,497,211 | A | * | 3/1996 | McNulty .................... 351/52 |
| D391,039 | S | | 2/1998 | Mongeon |
| D401,036 | S | * | 11/1998 | Clegg ..................... D2/869 |
| 5,926,848 | A | * | 7/1999 | Bartholomae ............... 2/171 |
| 6,024,102 | A | * | 2/2000 | Huang .................... 132/273 |
| 6,047,709 | A | * | 4/2000 | Tu ....................... 132/275 |
| 6,219,849 | B1 | | 4/2001 | Crescentini |
| 6,317,896 | B1 | | 11/2001 | Timms et al. |
| 6,374,419 | B1 | | 4/2002 | Pietsch |
| 6,389,604 | B1 | | 5/2002 | Day |
| 6,401,258 | B1 | | 6/2002 | Wilson |
| 6,421,838 | B1 | | 7/2002 | Frank |
| 6,513,167 | B1 | * | 2/2003 | Cheng ..................... 2/171 |
| 6,532,601 | B1 | | 3/2003 | Berman |
| 6,539,553 | B2 | | 4/2003 | Day |
| 6,647,554 | B1 | * | 11/2003 | Yan ..................... 2/209.13 |
| 6,662,376 | B2 | | 12/2003 | Cook |
| 6,671,886 | B1 | | 1/2004 | Reitz |
| 6,675,393 | B1 | | 1/2004 | Park |
| 6,688,316 | B1 | * | 2/2004 | Klug .................... 132/286 |
| 6,701,532 | B1 | | 3/2004 | Glassberg et al. |
| 2002/0066462 | A1 | * | 6/2002 | Denebeim ............... 132/275 |

* cited by examiner

*Primary Examiner*—Katherine M. Moran
(74) *Attorney, Agent, or Firm*—Harness, Dickey & Pierce, P.L.C.

(57) ABSTRACT

Decorative novelty head wear is provided including a head engaging member adapted to be worn on a user's head and at least one decorative member mounted to the head engaging member and including a generally flat substrate having a decorative surface. The decorative head wear can include sports team logos, college mascots, slogans, corporate logos, or other decorative indicia. The decorative head wear can be manufactured inexpensively and packaged very easily and shipped economically since the head wear takes up little space and is very light in weight.

17 Claims, 5 Drawing Sheets

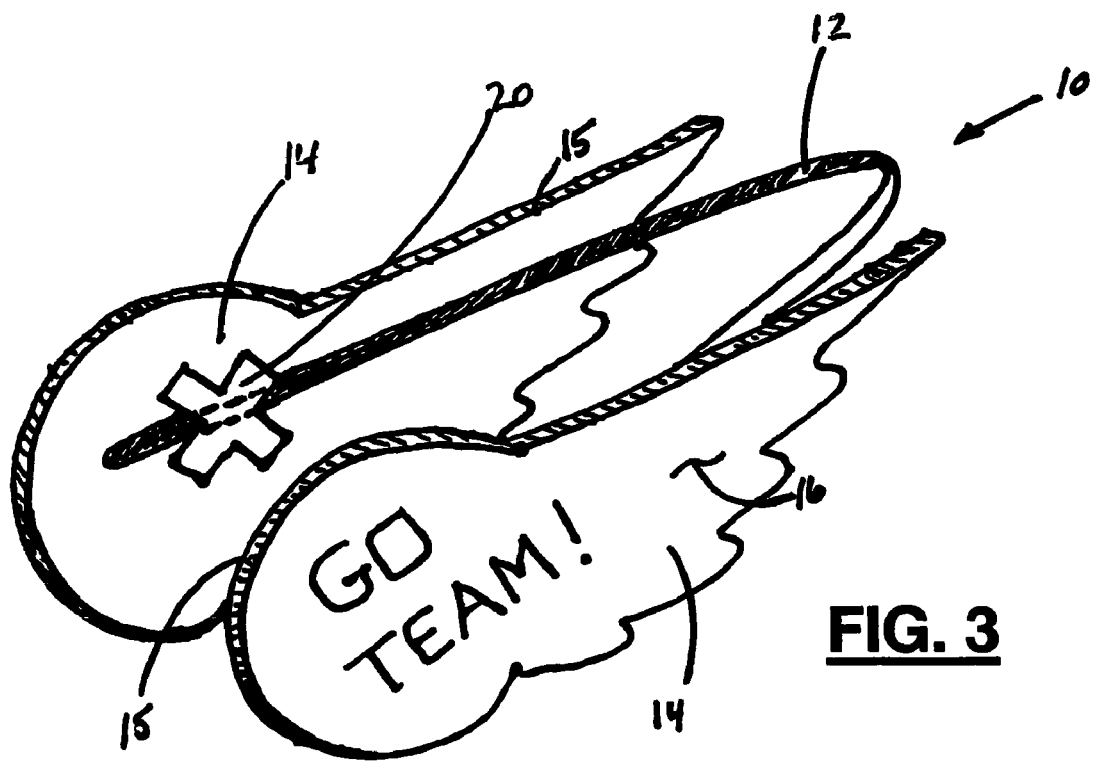
FIG. 3
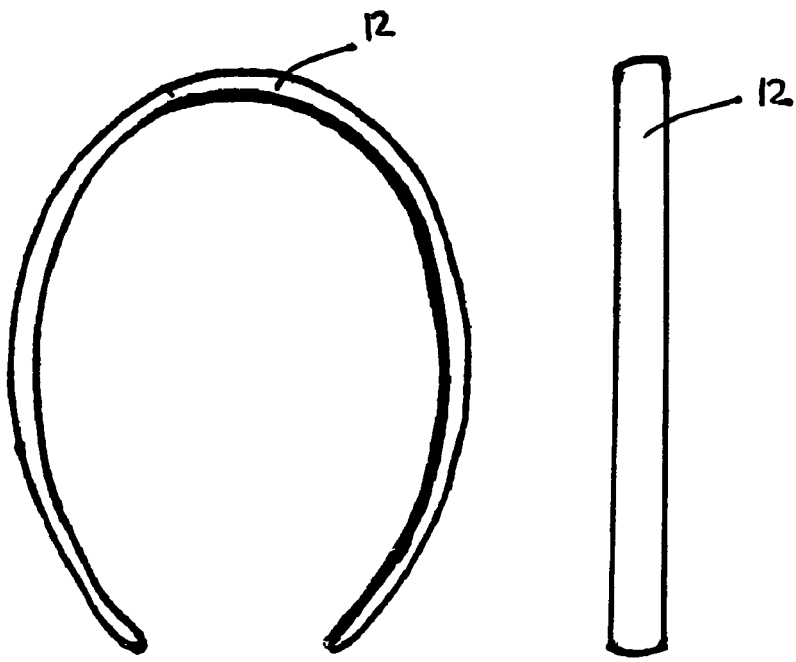 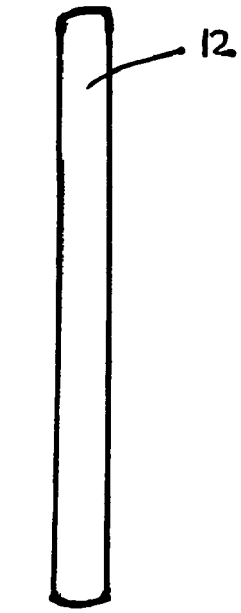
FIG. 4  FIG. 5

NOVELTY HEAD GEAR AND METHOD OF MAKING SAME

FIELD OF THE INVENTION

The present invention relates to novelty head gear and a method of making same.

BACKGROUND AND SUMMARY OF THE INVENTION

Novelty items are commonly sold at sporting events and often include team logos, college mascots, or corporate sponsorship logos. In addition, novelty head gear, such as hats (for example, the now famous "cheesehead" hat) have been popularized at sporting events. The present invention provides a relatively inexpensive alternative to existing novelty head wear that can be easily manufactured, packaged, distributed, and assembled by a consumer.

The present invention provides decorative head wear including a head engaging member which, according to a preferred embodiment, includes a generally U-shaped flexible plastic band, but alternatively may include a pair of eyeglasses, including sunglasses, a hat, or a headband. A decorative member is fastened to the head engaging member and, according to a preferred embodiment, includes a foam substrate having a printed-on decorated surface. The printed-on decorated surface can include a sticker, painted decoration, or printed on decoration, or combinations thereof. According to one embodiment, the decorated surface includes a sports team logo, college mascot, or other indicia representative of a sports theme, or can alternatively include corporate logos or other novelty designs such as flags, animals, and vehicles, such as cars, airplanes, trucks, motorcycles, etc.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of the head wear according to the principles of the present invention;

FIG. 4 is a front plan view of the flexible band designed to be used according to the principles of the present invention;

FIG. 5 is a side view of the flexible band shown in FIG. 4;

DETAILED DESCRIPTION OF THE PREFERRED EMBODIMENTS

The following description of the preferred embodiment(s) is merely exemplary in nature and is in no way intended to limit the invention, its application, or uses.

Figure 1:
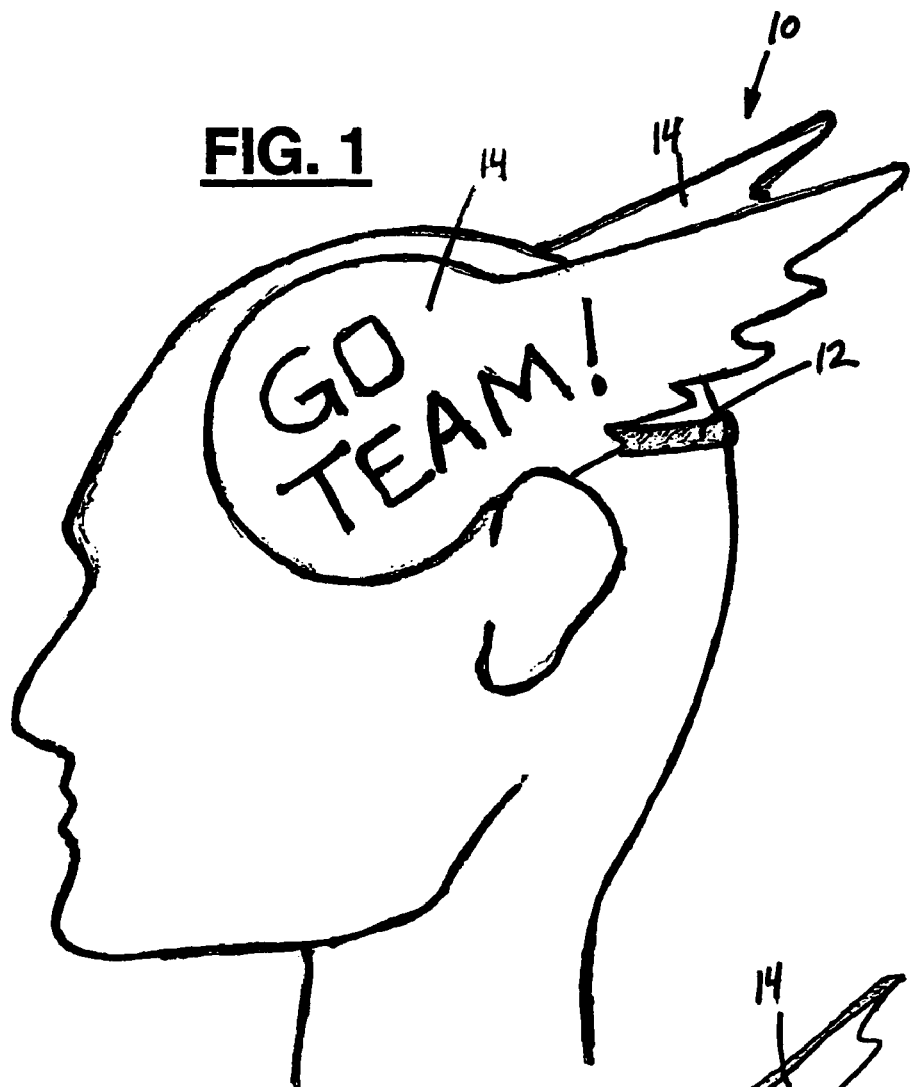
FIG. 1 is a side view of the decorative head wear according to the principles of the present invention being worn by a user.
Figure 2:
FIG. 2 is a front perspective view of the head wear according to the principles of the present invention being worn by a user.

With reference to FIGS. 1–5, a novelty head wear system, according to the principles of the present invention, will now be described. As illustrated in FIG. 1, the decorative head wear 10 includes a head engaging member 12 which engages a user's head. A pair of decorative members 14 are mounted to the flexible band 12. The flexible band 12 is generally U-shaped, as illustrated in FIG. 4 and is preferably made from a flexible material such as plastic, although other materials may be used. Each of the decorative members 14 is formed of a substrate material 15, such as foam, cardboard, pressboard, or plastic, although other materials may be used. A decorative surface 16 is provided on one side of the substrate with the decorative surface 16 being applied as a sticker which is adhered to the substrate, or alternatively, the decorative surface can include painted or printed decorative features applied directly to the substrate 15.

Figure 6:
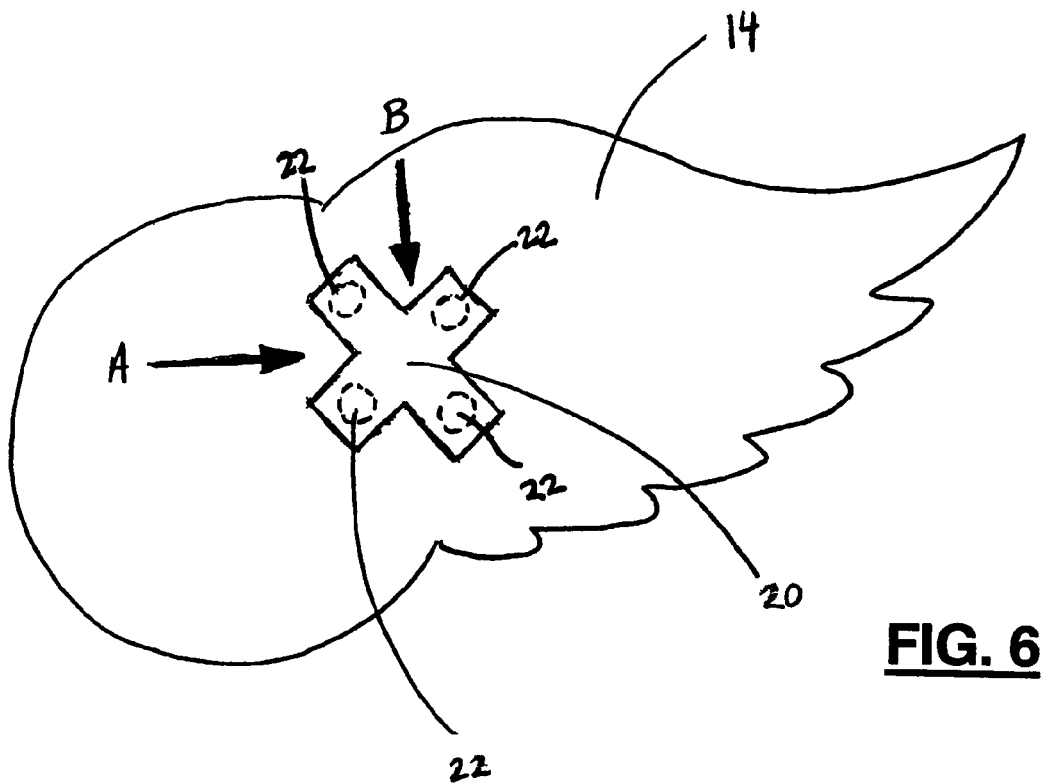
FIG. 6 is a plan view of the back of one of the decorative members illustrating the first preferred embodiment of an attachment system.

On the back side of each of the decorative members 14, an attachment system 20 is provided. The fastening system 20 includes a generally X-shaped material (best shown in FIG. 6), such as foam, fabric, or plastic being bonded or otherwise fastened at points 22 to the substrate 16 such as by ultrasonic welding, adhesive, stitching, staples or other known fastening methods. The attachment system 20 defines a channel illustrated by arrow A through which an end of the flexible band 12 can be inserted. In addition, the attachment system defines a vertical channel as illustrated by the arrow B through which the flexible band 12 can be inserted so as to be placed above a user's head in an alternative configuration.

Figure 7:
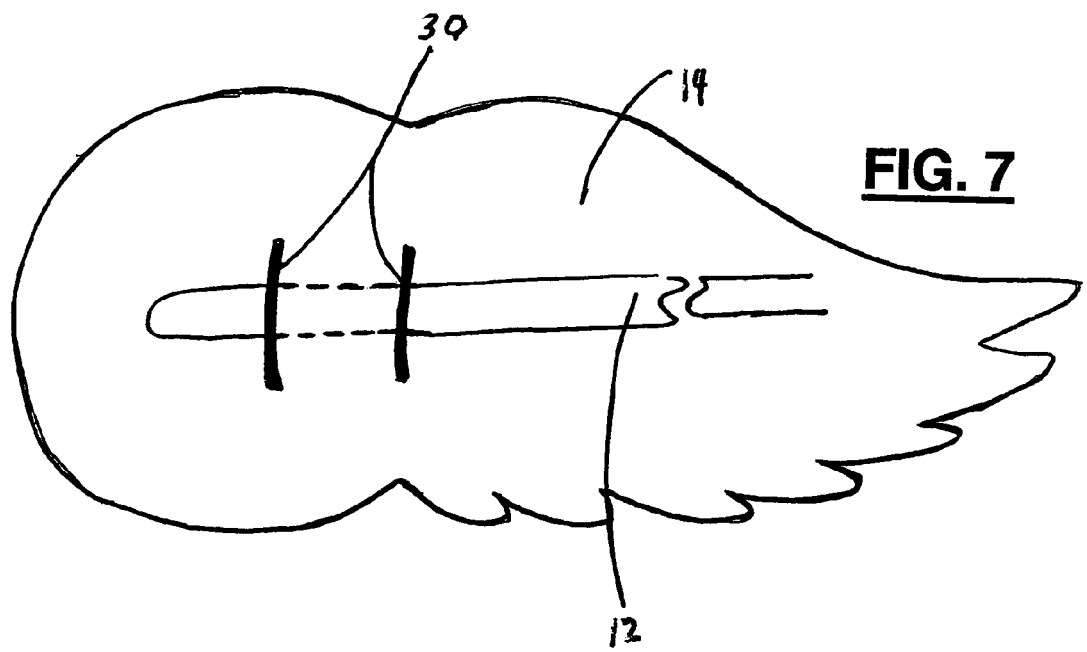
FIG. 7 is a back side view of one of the decorative members illustrating a second attachment system for attaching the decorative members to the head engaging member according to the principles of the present invention.
Figure 8:
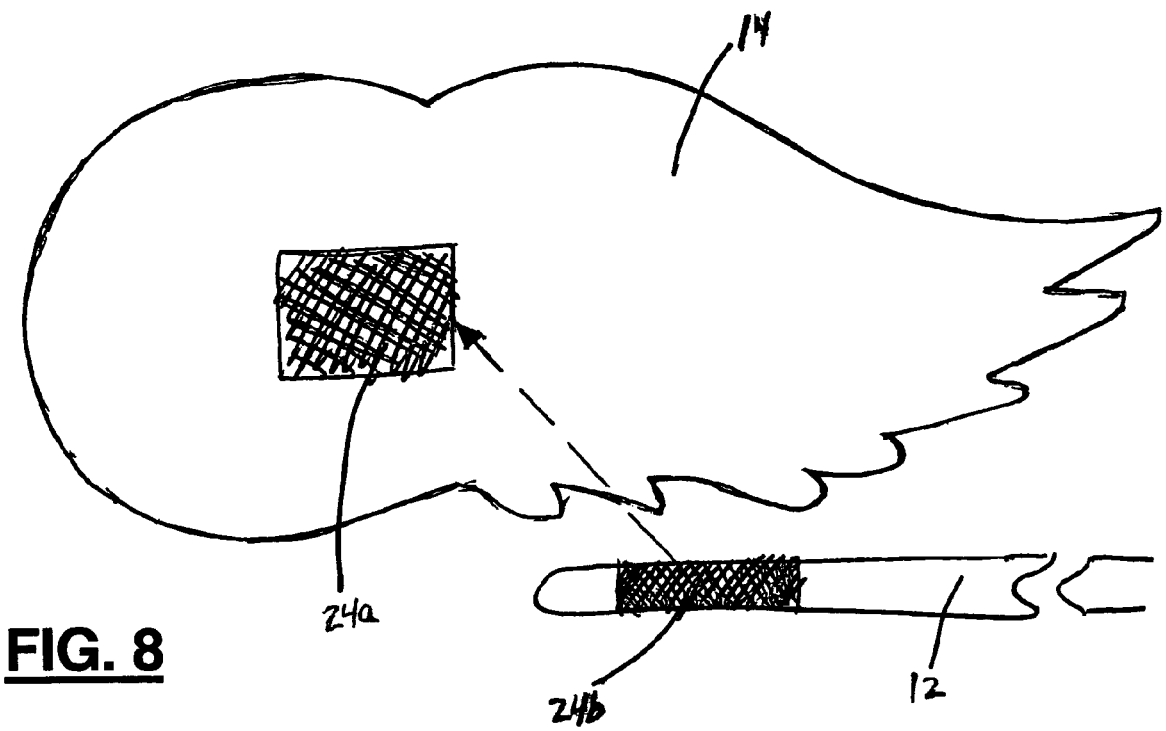
FIG. 8 is a back side view of the one of the decorative members illustrating a third embodiment of an attachment system for attaching the decorative member to the head engaging member according to the principles of the present invention.

Alternative attachment systems, such as the use of a hook-and-loop type fastener 24*a*, 24*b* for mounting the decorative member to the flexible band, as shown in FIG. 8, with one portion 24*a* of the hook-and-loop fastener being mounted to the back side of the decorative member 14 and a second portion 24*b* of the hook-and-loop fastener being mounted to the flexible band 12. According to yet another alternative embodiment, as illustrated in FIG. 7, the decorative member 14 can be provided with a pair of slits 30 through which the end portion of the flexible band 12 can be weaved, as illustrated in FIG. 7.

With the design of the present invention, the flexible band 12 is designed to be comfortable on a user, and yet provide a sufficient squeezing force against the user's head in order to maintain a proper position of the decorative head wear while the flexible band 12 is looped behind the user's head. The flexible band can have numerous colors, or can be formed of clear plastic so as to be less visible when worn by a user.

Figure 9:
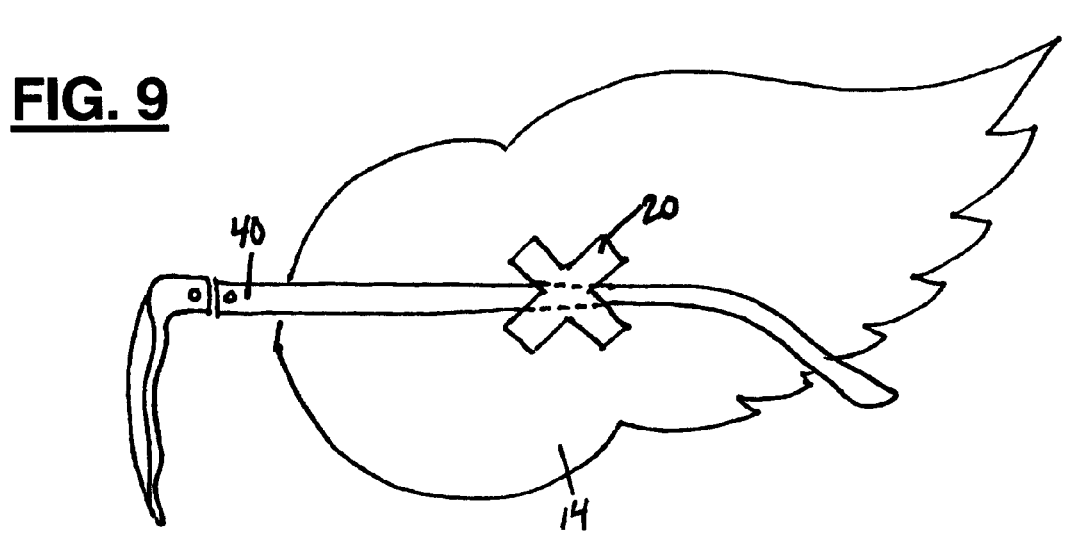
FIG. 9 is a perspective view of the decorative head wear according to the principles of the present invention with the decorative members mounted to a pair of eyeglasses.
Figure 10:
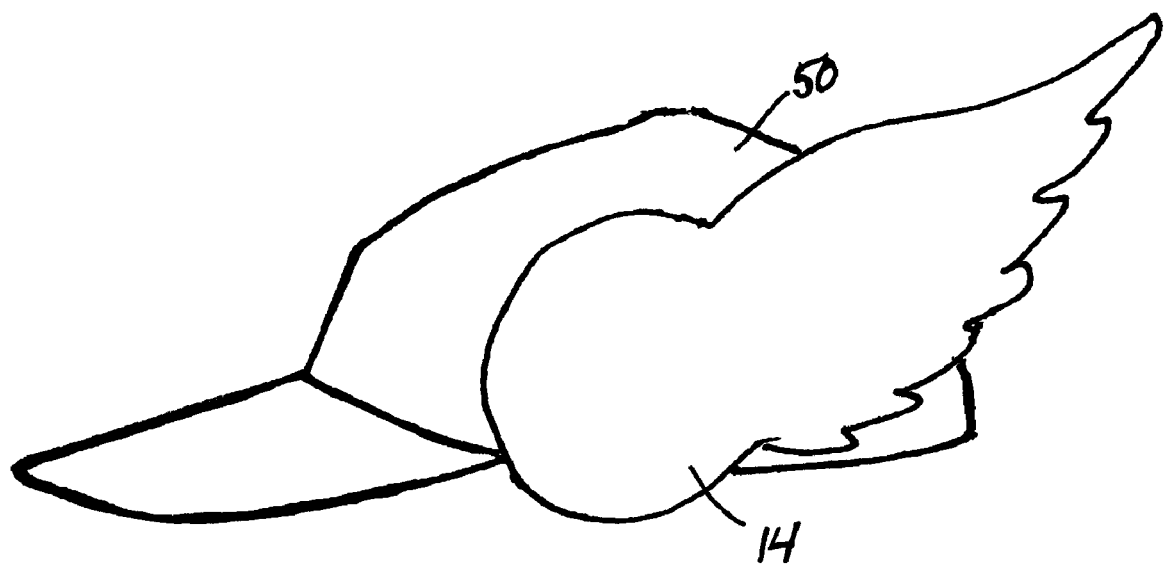
FIG. 10 is a perspective view of the decorative head wear according to the principles of the present invention with the decorative members mounted to a hat.
Figure 11:
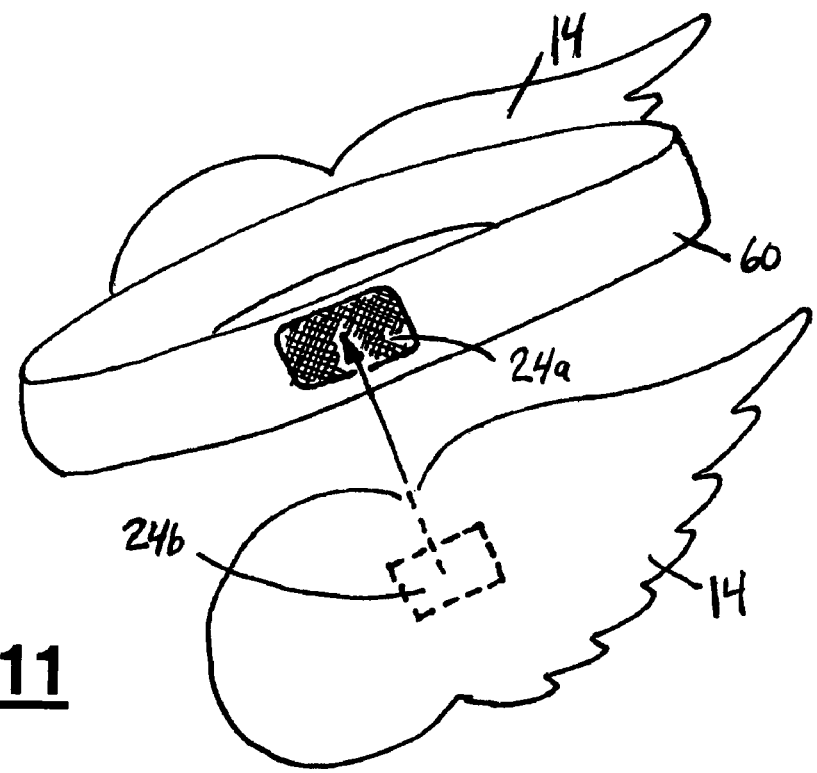
FIG. 11 is a perspective view of the decorative head wear according to the principles of the present invention with the decorative members mounted to a head band.

It is further anticipated that the decorative members formed of a flat substrate having a decorative surface can also be utilized in combination with other known head engaging members, such as eyeglasses 40, as shown in FIG. 9, a baseball cap or other hat 50, as shown in FIG. 10, or a headband 60, as shown in FIG. 11. The use of a hook-and-loop type fastener system 24*a*, 24*b* would facilitate the attachment of the decorative members to either a hat or headband, while the fastening system 20 illustrated in FIG. 6 or the slits 30 illustrated in FIG. 7 readily facilitate the mounting of the decorative members 14 to a pair of glasses 40.

The method of making the decorative head wear, according to the principles of the present invention, is relatively simple, and can include stamping, cutting, or otherwise forming the shape of the decorative members from a substrate sheet, such as, but not limited to, foam, cardboard, pressboard, or plastic. A decorative surface is applied to one surface of the substrate, such as by an adhesive sticker or label, painting or printing, or combinations thereof. A decorative surface can include sports team logos, college mascots, slogans, corporate logos, or other decorative symbols. The decorative members are provided with the appropriate attachment system, as described above with reference to FIGS. 6–8, or other alternative attachment systems which are known in the art. The decorative member can then be inserted into a package such as a plastic bag or box along with the flexible band, so that the three members can be packaged as a flat system which will facilitate the easy mass shipment of the decorative head wear. The decorative head wear is easy to assemble by inserting the ends of the flexible band 12 through the attachment system 20 in order to facilitate this easy packaging method.

The flat substrate 15 making up the decorative members 14 is preferably formed from a memory foam which, even if bent or indented during shipments will resume its generally flat full shape within a short amount of time after being removed from the packaging. The decorative members 14 can also be sold in combination with a headband 60 to which the decorative members 14 can be applied after removal from the packaging. The decorative members 14 may alternatively be sold as separate items which can be mounted to a user's eyeglasses or sunglasses 40, or to a user's hat 50. Alternatively, the decorative members can also be sold in combination with a hat 50 or provided with a hook-and-loop fastener system on the hat and the decorative members for facilitating easy assembly of the decorative members 14 onto the hat 50. It should also be understood that the decorative members 40 of the present invention can also be attached to a person's hair or hat by use of hair pins, safety pins, or other clamps or clips or snaps.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. Decorative head wear, comprising:
   a head engaging member adapted to be worn on a user's head;
   at least one decorative member mounted to the head engaging member and including a generally flat substrate having a decorated surface, wherein said at least one decorative member includes an attachment system for removably attaching said at least one decorative member to said head engaging member, said attachment system includes a retainer member bonded to a back surface of said substrate and defining a pair of generally perpendicular channels between said substrate and said retainer member for selectively receiving said head engaging member in either of said channels.

2. The decorative head wear according to claim 1, wherein said decorated surface is a sticker that is adhered to said substrate.

3. The decorative head wear according to claim 1, wherein said decorated surface is painted on said substrate.

4. The decorative head wear according to claim 1, wherein said decorated surface is printed on said substrate.

5. The decorative head wear according to claim 1, wherein said substrate and said retainer member are made from a foam material.

6. The decorative head wear according to claim 5, wherein said retainer member includes an X-shaped body having four arm members each having an end portion attached to said substrate.

7. The decorative head wear according to claim 1, wherein said head engaging member is a generally U-shaped flexible band.

8. Decorative head wear, comprising:
   a generally U-shaped flexible band adapted to be worn on a user's head;
   at least one decorative member removably mounted on the flexible band, said decorative member includes a generally flat foam substrate having a decorated surface, wherein said at least one decorative member includes an attachment system for removably attaching said at least one decorative member to said head engaging member, said attachment system includes a retainer member attached to a back surface of said foam substrate and defining a pair of generally perpendicular channels between said substrate and said retainer member for selectively receiving said head engaging member in either of said channels.

9. The decorative head wear according to claim 8, wherein said decorated surface is a sticker that is adhered to said foam substrate.

10. The decorative head wear according to claim 8, wherein said decorated surface is painted on said foam substrate.

11. The decorative head wear according to claim 8, wherein said decorated surface is printed on said foam substrate.

12. The decorative head wear according to claim 8, wherein said retainer member includes an X-shaped foam body having four arm members each having an end portion attached to said foam substrate.

13. Decorative head wear, comprising:
   a generally U-shaped band adapted to be worn on a user's head;
   a pair of decorative members mounted to opposite ends of the band so as to conceal said opposite ends of said band when worn on a user's head, said pair of decorative members each having a generally flat substrate with a decorated surfaces wherein each of said pair of decorative members includes an attachment system for removably attaching said pair of decorative members to said band, said attachment system includes a retainer member bonded to a back surface of said substrates and defining a pair of generally perpendicular channels between said substrate and said retainer member for selectively receiving said ends of said band in either of said channels.

14. The decorative head wear according to claim 13, wherein said generally flat substrate of said pair of decorative members and said retainer members are made from foam.

15. The decorative head wear according to claim 13, wherein said decorated surface is provided on a sticker that is adhered to said generally flat substrate.

16. The decorative head wear according to claim 13, wherein said decorated surface includes at least one logo indicative of a sports team.

17. The decorative head wear according to claim 13, wherein said retainer member includes an X-shaped body having four arm members each having an end portion attached to said substrate.

* * * * *